C. W. GRANNIS.
Milk-Cooler and Cheese-Vat.
No. 161,608. Patented April 6, 1875.
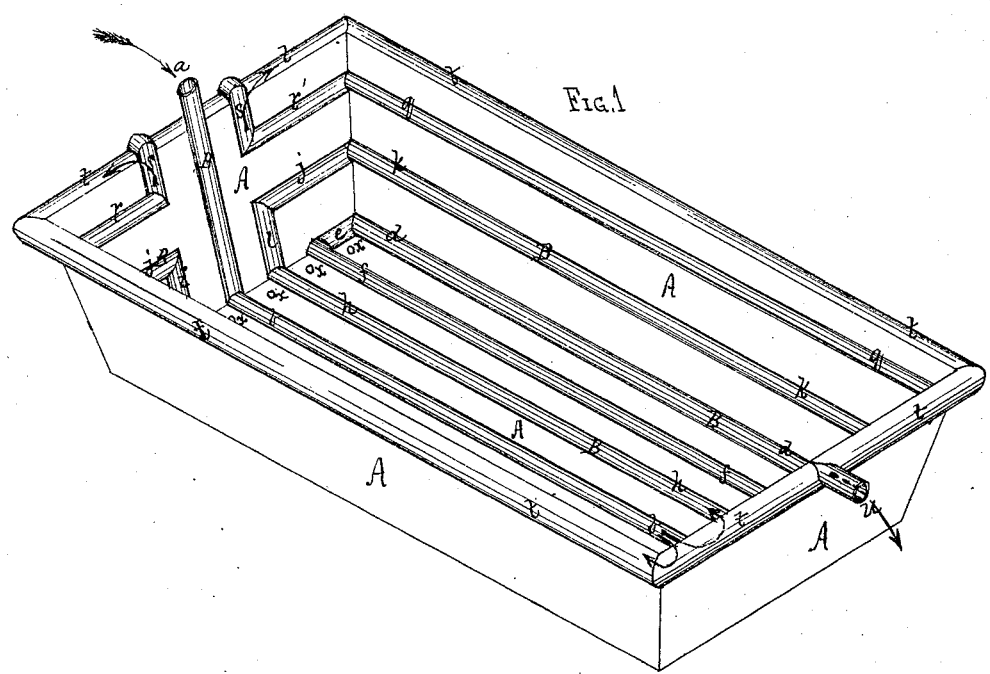
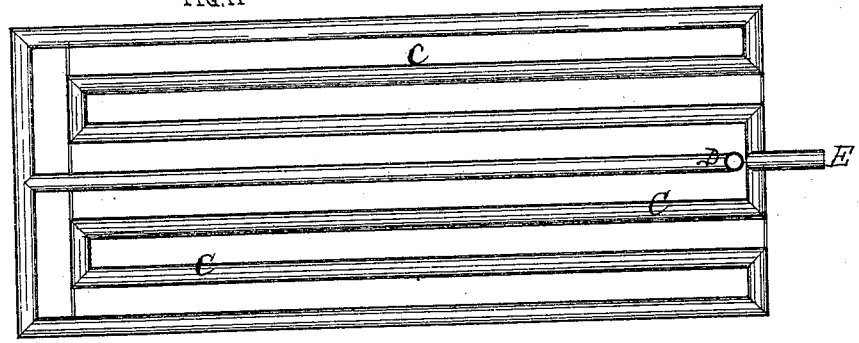
WITNESSES.
Robt Henenge
C. N. Woodward
Charles Waddon Grannis
INVENTOR, By
Burke Fraser & Co
attys.

UNITED STATES PATENT OFFICE.

CHARLES W. GRANNIS, OF GOWANDA, NEW YORK.

IMPROVEMENT IN MILK-COOLERS AND CHEESE-VATS.

Specification forming part of Letters Patent No. 161,608, dated April 6, 1875; application filed December 23, 1874.

*To all whom it may concern:*

Be it known that I, CHARLES WATTON GRANNIS, of Gowanda, in the county of Erie and State of New York, have invented certain new and useful Improvements in Combined Milk-Coolers and Cheese-Vats, of which the following is a specification:

This invention relates to a pan for use in cooling milk and making cheese; and consists in securing to the sides, bottom, and edges of such pans a series of connected pipes, the central pipe being the induction and the edge pipe the eduction pipe.

In the drawings, Figure 1 is a perspective view of the vat, showing the arrangement of the pipes. Fig. 2 is a plan view of the worm or nest. Fig. 3 is a cross-section of the vat, showing the worm suspended therein.

A represents a pan or vat made with flaring or conical sides. On the interior of the vat are secured a series of semicircular or flat tubes or conductors, B, which commence at $a$, the induction end, Fig. 1, which is carried downward, and continued along the bottom of the vat, as at $b$, and connects with a similar pipe, $c$, across the opposite end of the vat. (See Fig. 3.) This cross-pipe $c$ connects at either end to pipes $d\ d'$, which run back along the sides of the vat, and connect with short pipes $e$, on the opposite end, which in turn connect to pipes $f$ running along the bottom of the vat parallel with pipes $d\ d'$. These pipes then connect with short pipes $g$, (see Fig. 3,) similar to pipes $e$, which are placed a short distance from the end of the vat, and which connect with two other pipes, $h$, which run along the bottom of the tank parallel with pipes $b$ and $f$, as shown. These pipes then connect with small pipes $i$, which run upward upon the end of the vat, and connect with short pipes $j$, which are attached to pipes $k\ k'$, running along the sides of the vat into pipes $m\ m'$, which meet in the center of the vat, (see Fig. 3,) and are continued by a small pipe, $n$, into two pipes, $p\ p'$, similar to pipes $m\ m'$, which in turn connect with pipes $q\ q'$, running parallel with pipes $k$ and $d$, along the sides of the vat a short distance from the top. These pipes $q\ q'$ connect with pipes $r\ r'$ on the end of the vat, and so on into small upright pipes $s\ s'$, which connect with a pipe, $t$, running entirely around the top edge of the vat, and which terminates in a discharge-pipe, $u$.

A faucet or stop-cock placed in the discharge-pipe $u$ will regulate the flow of water so that it need not discharge until its cooling or heating properties have become neutralized.

These pipes B, above described, that are arrang'd on the sides, are set slanting, so as to insure a perfect flow and circulation and avoid dead water.

The pipes will be made nearly flat, so as to get a greater cooling or heating surface.

By these means cold or hot water or steam, introduced at $a$, passes around the sides and bottom of the pan or vat, and reaches almost every part of its surface, thereby heating the milk to an even temperature in a very short time if desired for cheese, or cooling it thoroughly if used merely as a milk-cooler.

To further insure the effect desired, and to more surely reach the mass of milk, or other liquid contained in the pan or vat, I insert a worm, C, constructed of a series of pipes either round or flat, all connected together, through which the cooling or heating liquid circulates, being introduced at D, and exiting through a pipe, E, that discharges over the edge of the vat A. This may be made, if the vat is deep, of several layers or shelves of pipes, and be suspended in the vat, as shown.

By my devices all parts of the liquid are reached. The vat, constructed with the circulating-pipes, cools all the surface parts, and the worm or coil does the same for the body of the fluid. Steam or hot water will be run in to scald the milk or curd for cheese-making.

The worm may be suspended in the vat by adjustable hangers, or otherwise.

The pipes form part of the walls and bottom of my vat, and thus aid greatly in strengthening the whole, and in preventing sagging.

I claim—

The herein-described pan for use in cooling milk or making cheese, composed of the vessel A, provided with a fixed central induction-pipe, B, and connected series of fixed pipes $b$, $c$, $d$ $d'$, $e$, $f$, $g$, $h$, $i$, $j$, $k$ $k'$, $p$ $p'$, $q$ $q'$, $r$ $r'$, $s$ $s'$, and $t$, and the eduction-pipe $u$, constructed and arranged substantially as shown and specified.

In witness whereof I have hereunto signed my name in the presence of two subscribing witnesses.

CHAS. W. GRANNIS.

Witnesses:
J. R. DRAKE,
C. N. WOODWARD.